(12) United States Patent
Penta et al.

(10) Patent No.: US 11,080,324 B2
(45) Date of Patent: Aug. 3, 2021

(54) TEXT DOMAIN IMAGE RETRIEVAL

(71) Applicant: Accenture Global Solutions Limited, Dublin (IE)

(72) Inventors: Antonio Penta, Cork (IE); Md Faisal Zaman, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 338 days.

(21) Appl. No.: 16/208,077

(22) Filed: Dec. 3, 2018

(65) Prior Publication Data

US 2020/0175061 A1 Jun. 4, 2020

(51) Int. Cl.
| | | |
|---|---|---|
| *G06F 17/00* | (2019.01) | |
| *G06F 16/532* | (2019.01) | |
| *G06F 16/93* | (2019.01) | |
| *G06F 16/538* | (2019.01) | |
| *G06F 16/58* | (2019.01) | |
| *G06F 16/383* | (2019.01) | |
| *G06F 16/30* | (2019.01) | |

(52) U.S. Cl.
CPC ......... *G06F 16/532* (2019.01); *G06F 16/383* (2019.01); *G06F 16/538* (2019.01); *G06F 16/5866* (2019.01); *G06F 16/93* (2019.01)

(58) Field of Classification Search
None
See application file for complete search history.

(56) References Cited

U.S. PATENT DOCUMENTS 8,429,173 B1 * 4/2013 Rosenberg .............. G06F 16/14
707/748
8,478,052 B1 * 7/2013 Yee ..................... G06F 16/5846
382/224

(Continued)

FOREIGN PATENT DOCUMENTS

| JP | 2005-115721 | 4/2005 |
| JP | 2009-193187 | 8/2009 |

(Continued)

OTHER PUBLICATIONS

Extended European Search Report in Europe Application No. 19206759.3, dated May 19, 2020, 9 pages.

(Continued)

*Primary Examiner* — Polina G Peach
(74) *Attorney, Agent, or Firm* — Brinks Gilson & Lione

(57) ABSTRACT

An image retrieval system may receive an image query that includes image data. The image retrieval system may determine an image descriptor based on the image data. The image retrieval system may obtain a text descriptor associated with the image descriptor in the descriptor repository. The image retrieval system may generate a document query comprising a search parameter, the search parameter including the text descriptor. The image retrieval system may identify, in a document database, text documents based on the document query. The text documents may be associated with document identifiers. The image retrieval system may obtain, from the file mapping repository, image identifiers associated with the document identifiers. The image query result from the image retrieval system may reference images associated with the image identifiers.

17 Claims, 6 Drawing Sheets

(56) References Cited

U.S. PATENT DOCUMENTS

| | | | | |
|---|---|---|---|---|
| 8,494,983 | B2* | 7/2013 | Wang | G06F 16/5838 706/12 |
| 8,971,641 | B2* | 3/2015 | Buchmueller | G06F 16/583 382/209 |
| 9,002,831 | B1* | 4/2015 | O'Malley | G06F 16/5838 707/723 |
| 9,280,560 | B1* | 3/2016 | Dube | G06K 9/6276 |
| 9,443,314 | B1* | 9/2016 | Huang | G06K 9/00684 |
| 10,162,865 | B2* | 12/2018 | Yuen | G06F 16/24578 |
| 2007/0214172 | A1* | 9/2007 | Nister | G06F 16/5838 |
| 2009/0324100 | A1* | 12/2009 | Kletter | G06F 16/5838 382/217 |
| 2010/0098336 | A1* | 4/2010 | Takahashi | G06K 9/00993 382/176 |
| 2010/0223276 | A1* | 9/2010 | Al-Shameri | G06K 9/0063 707/769 |
| 2011/0137895 | A1* | 6/2011 | Petrou | H04W 4/02 707/723 |
| 2011/0229045 | A1* | 9/2011 | Yu | G06K 9/00664 382/224 |
| 2012/0054239 | A1* | 3/2012 | Chung | G06F 3/0481 707/776 |
| 2012/0158721 | A1* | 6/2012 | Hua | G06F 16/5838 707/736 |
| 2013/0054562 | A1* | 2/2013 | Bennett | G06F 16/532 707/710 |
| 2013/0202213 | A1* | 8/2013 | Adamek | G06K 9/4676 382/201 |
| 2013/0204866 | A1* | 8/2013 | Fork | G06F 16/532 707/723 |
| 2014/0046935 | A1* | 2/2014 | Bengio | G06F 16/338 707/723 |
| 2015/0154232 | A1* | 6/2015 | Ovsjanikov | G06F 16/532 707/780 |
| 2015/0161086 | A1* | 6/2015 | Wu | G06F 3/04842 715/234 |
| 2015/0169740 | A1* | 6/2015 | Gunderson | G06F 16/27 707/749 |
| 2016/0070990 | A1* | 3/2016 | Zhang | G06K 9/6218 382/218 |
| 2016/0275376 | A1* | 9/2016 | Kant | G06K 9/209 |
| 2016/0321300 | A1* | 11/2016 | Kamath | G06F 16/58 |
| 2016/0328610 | A1* | 11/2016 | Thompson | G06Q 10/10 |
| 2017/0103072 | A1* | 4/2017 | Yuen | G06F 16/58 |
| 2017/0177976 | A1* | 6/2017 | Dube | G06K 9/52 |
| 2017/0344822 | A1* | 11/2017 | Popescu | G06F 16/56 |
| 2018/0189325 | A1* | 7/2018 | Hohwald | G06N 3/0454 |
| 2020/0097764 | A1* | 3/2020 | de Juan | G06K 9/6255 |

FOREIGN PATENT DOCUMENTS

| | | |
|---|---|---|
| JP | 2015-529908 | 10/2015 |
| WO | WO 2014/025592 A1 | 2/2014 |

OTHER PUBLICATIONS

Simpson et al., "Multimodal Biomedical Image Indexing and Retrieval Using Descriptive Text and Global Feature Mapping", Information Retrieval, vol. 17, No. 3, dated Nov. 13, 2013, pp. 229-264, XP055691005, Springer, NL.

Sivic et al., "Video Google: a Text Retrieval Approach to Object Matching in Videos", Proceedings 9$^{th}$ IEEE International Conference on Computer Vision (ICCV), Nice, France, dated Oct. 13, 2003, Los Alamitos, CA, IEEE Comp. Soc. vol. Conf. 9, dated Oct. 13, 2003, pp. 1470-1477, XP010662565.

Datta et al., "Image Retrieval: Ideas, Influences, and Trends of the New Age", ACM Computing Surveys, ACM, New York, NY, US, vol. 40, No. 2, dated May 8, 2008, pp. 1-60, XP058123229.

Wengang Zhou et al., "Recent Advance in Content-based Image Retrieval: A Literature Survey," dated Sep. 2, 2017, pp. 1-22, published online by Cornell University at URL https://arxiv.org/abs/1706.06064.

Office Action issue on Japanese application 2019-198231, dated Dec. 3, 2020, 8 pages.

* cited by examiner

US 11,080,324 B2

TEXT DOMAIN IMAGE RETRIEVAL

TECHNICAL FIELD

This disclosure relates to image processing and, in particular, to image retrieval and computer vision.

BACKGROUND

Image retrieval involves identifying images based on search criteria. In some approaches to image retrieval, images are annotated with descriptive metadata. The metadata can be searched to identify images based on keywords included in the search criteria. In content-based approaches to image retrieval, an input image may be compared with historical image data stored in one or more large databases. Image results may be formulated by way of on pixel comparisons, feature comparisons, and/or other computer vision techniques.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
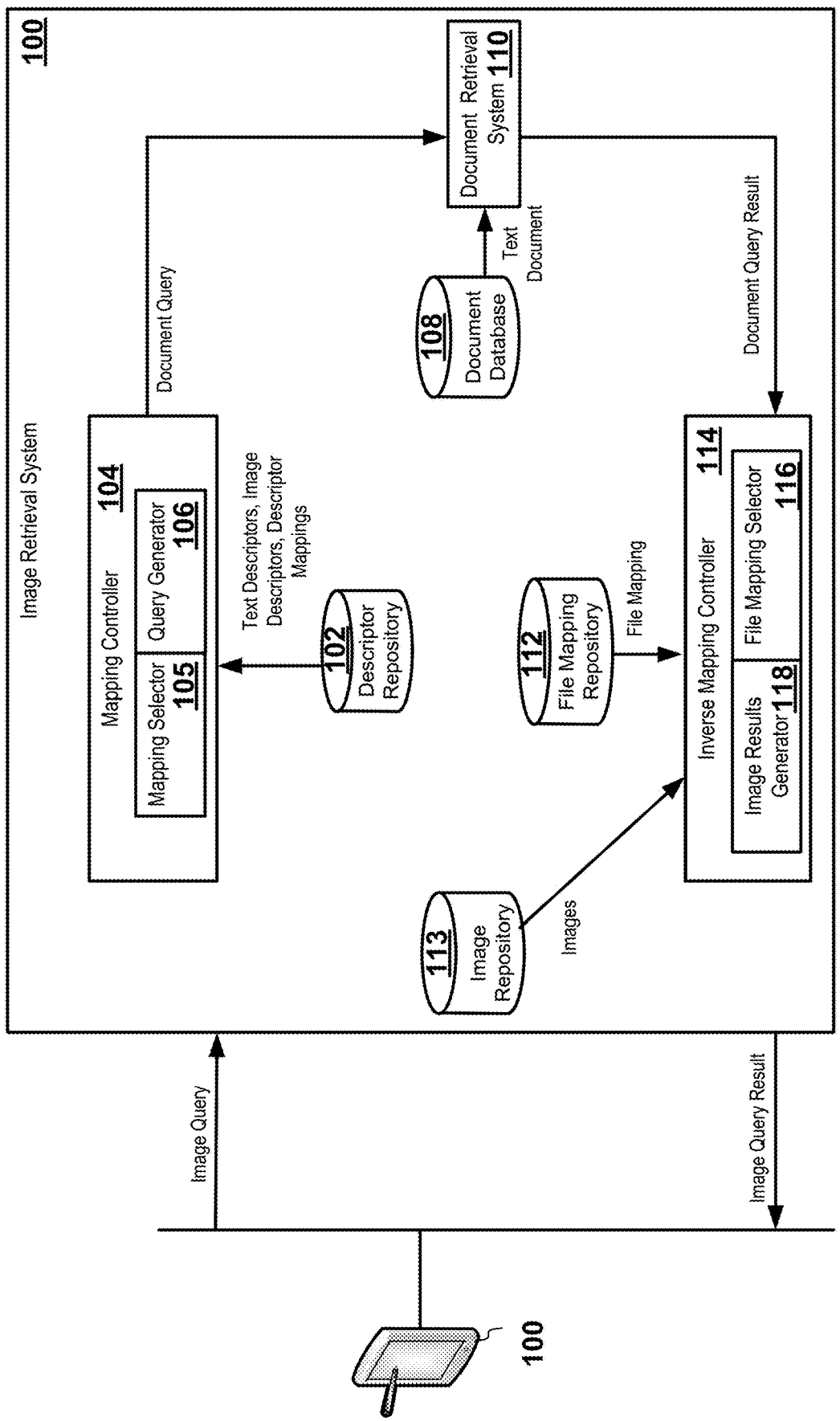
FIG. 1 illustrates a first example of an image retrieval system.

Image retrieval involves identifying images based on search criteria. In some approaches to image retrieval, images are annotated with descriptive metadata. The metadata can be searched to identify images based on keywords. The metadata may be established by manually annotating large quantities of images. In many examples, the metadata may describe the semantic qualities of the image, without taking into consideration the contextual use of the image in text. The metadata may remain fixed while the context in which the image is used may vary over time.

In content-based approaches to image retrieval, an input image may be compared with historical image data stored in one or more large databases. Image results may be formulated by way of on pixel comparisons, feature comparisons, and/or other content comparison techniques. For example, Zhou et al, *Recent Advance in Content-based Image Retrieval: A Literature Survey*, published 2 Sep. 2018 by Institute of Electrical and Electronics Engineers, which is hereby incorporated by reference, describes various image representations in which image features are stored and indexed in a database. These approaches fail to provide robust image query results based on criteria that considers factors other than semantic similarity of image content.

Accordingly, there is disclosed systems and methods for text-based image retrieval relying on local similarity in the image space and textual space. By way of an introductory example, an image retrieval system may include a descriptor repository comprising a plurality of descriptor mappings. The descriptor mappings may include respective associations between image descriptors and text descriptors. The system may further include a file mapping repository. The file mapping repository may include file mappings. Each of the file mappings may include an association between a corresponding image and a corresponding text document.

The system may receive an image query. The image query may include image data. The system may determine an image descriptor based on the image data. The system may obtain a text descriptor associated with the image descriptor in the descriptor repository. The system may generate a document query comprising a search parameter. The search parameter may include the text descriptor. The system may identify, in a document database, text documents based on the document query. The text documents may be associated with document identifiers. The system may obtain, from the file mapping repository, image identifiers associated with the document identifiers. The system may communicate an image query result to a remote device. The image query result may be indicative of images corresponding to the image identifiers.

One technical advantage of the system and methods described herein may be that a text-based document query may improve the processing times involved in image retrieval. For example, the system and methods described herein may perform image retrieval based on mappings between images data and textual data. An input image may be converted image descriptors that are mapped to text descriptors. The text descriptors may be complied into a document query for a document database. Thus, searching is performed in the text domain instead of the image domain where image analysis may be costly in terms of processing power and processing time.

Another technical advantage of the system and methods described herein may be that images may be retrieved based on factors other than the semantic meaning of the image. For example, the mappings between the image and text descriptors are derived by ensuring that images that are similar are mapped to documents that have the same topics, such that the image retrieval system may preserve the local similarity both in the image space and textual space. The text data that is mapped to the image data may not describe the semantic meaning of the image. The mapping between text and image descriptors are accurately learned from training data using a local similarity preserved criteria, which means that image objects that are semantic similar in the image domain should be mapped to text objects that are semantic similar in the textual domain.

Accordingly, the image retrieval system may retrieve images in applications where the semantic content of the image cannot be reduced in only one main object but the image presents multiple objects, and the comparison of only image features can be limited by the scale of the objects, while the system is able to map an image descriptor to multiple text descriptors increasing the expressivity of the feature. The additional benefits, efficiencies, and improvements over existing market solutions are made evident in the systems and methods described herein.

FIG. 1 illustrates a first example of an image retrieval system 100. The system 100 may receive an image query and respond with an image query result. The image query may include a request to find images associated with or similar to a search image, or search images, specified in the image query. The image query may include image data such as an image file, a video frame, RGB data, image feature data, and/or any other information that is arranged according to a protocol for storing, rendering, or representing imagery. Alternatively or in addition, the image query may include a location, such as a web address or file path to receive image data.

The image query result may include a query result indicative of one or more images that are associated with, similar to, and/or found in similar contexts as the search image. The image query result may include image data and/or identifying information of the specified image. Alternatively or in addition, the image query result may include a location, such as a web address or file path to one or more images. In some examples, the image query results may include an instruction or link that causes the image to be retrieved or downloaded from the image retrieval system 100 or some other image source.

Descriptor Repository

The image retrieval system may include a descriptor repository 102. The descriptor repository 102 may include image descriptors, text descriptors, and/or descriptor mappings.

An image descriptor may include a description of the visual characteristics an image. For example, the image descriptor may include features of the image. The features may include image feature metrics. The image feature measures may measure the elementary characteristics of an image, such as the shape, color, texture, and/or some other visual characteristics of an image that can be defined in real values. For example, the image descriptor may include a color space and the features of the image descriptor may include the RGB values at each pixel. In some examples, the image descriptor may include a description of one or more features that define edges, corners, blobs, ridges, regions of interests, and/or other types of visual characteristics.

Table 1 illustrates an example of a data structure that includes image descriptors. By way of example, the image descriptor described in Table 1 includes a color distribution where pixel values are assigned a weight value.

TABLE 1

Image Descriptor Table

| Image Descriptor ID | Image Descriptor |
| --- | --- |
| IMG_DESC_DOG | Color Distribution: Red: 10%, Black 10% Brown 45%, . . . |
| IMG_DESC_CAT | Color Distribution: Red: 10%, Black 10%, Brown 50%, . . . |
| IMG_DESC_CAR | Color Distribution: Red: 60%, Black 5%, Brown 10%, . . . |

The data structure illustrated in Table 1 is a non-limiting example. The descriptor repository 102 may include the data structure described in Table 1. In other examples, the descriptor repository 102 may include additional or alternative data structure(s) that store image descriptors.

A text descriptor may include a description of the contents of a text. For example, the text descriptor may include a characteristic that describes the characters, words, sentences, semantics and/or linguistics of the text. The text descriptor may include a plurality of features. The features of the text descriptor may include text feature metrics that measure the characteristic of the text with real values. For example, the text descriptor may include a vector or matrix of numeric values. In some examples, the image descriptor may include a word distribution and the features of the image descriptor may include the counts of particular words in the text. Other examples of text descriptors may include topics, entities, triples.

Table 2 illustrates an example of a data structure that includes text descriptors. By way of example, the text descriptors described in Table 2 includes a word distribution where word counts are normalized.

TABLE 2

| Text Descriptor Table | | | | |
| --- | --- | --- | --- | --- |
| Text Descriptor | | | | |
| | | Word Distribution | | |
| Text Descriptor ID | | "Dublin" | "Ireland" | "Rome" |
| TXT_DUBLIN_1 | Normalized Count | 0.7 | 0.6 | 0.2 |
| TXT_IRELAND_2 | Normalized Count | 0.6 | 0.8 | 0.2 |
| TXT_ROME_2 | Normalized Count | 0.5 | 0.3 | 0.9 |

The data structure illustrated in Table 2 is a non-limiting example. The descriptor repository 102 may include the data structure described in Table 2. In other examples, the descriptor repository 102 may include additional or alternative data structure(s) that store text descriptors.

In the example described by Table 2, the text descriptors may respectively correspond to text extracted from a Dublin travel guide, a Ireland travel guide, and a Rome travel guide. The normalized word counts represents weights assigned to the word counts for "Dublin", "Ireland", and "Rome". As would be expected, the normalized count for the word "Dublin" is highest in the text descriptor TXT_DUBLIN_1, which corresponds to the text descriptor for the Dublin travel guide.

A descriptor mapping may include a learned association from a large set of images and texts where the objective is to optimize local descriptor similarity. In other words, image descriptors that are affinely similar in an image domain are mapped with text descriptors that are affinely similar in a textual domain. For example, image descriptors may be affinely similar when the real values representative of features for the image descriptors and/or weighted values derived from the real values are greater than a threshold value for image feature similarity. Likewise, text descriptors may be affinely similar when real values of the features of the text descriptor and/or weight values derived from the real values are greater than a threshold value for text feature similarity.

The similarity threshold value(s) for establishing similarity may include a tolerance. In some examples, the tolerance may be configurable. Increase the tolerance may decrease the number of descriptors that are identified as similar, but increase the degree of similarity. Decreasing the tolerance my increase the number of descriptors that are identified as similar but decrease the degree of similarity.

In an example, in the image domain, IMG_DESC_DOG may be similar to IMAGE_DESC_CAT because each share a feature (black) with a weight greater than 40%. In the text domain, TXT_DUBLIN, and TXT_IRELAND may be similar because the normalized count of "Dublin" and "Ireland" is greater than 0.5 in each text descriptor. As shown below in Table 1, mapping between a textual descriptor and an image descriptor is composed of many-to-many links between image and text descriptors.

The descriptor mapping may associate an image descriptor with a text descriptor. For example, the descriptor mapping may include an identifier of the text descriptor and an identifier of the image descriptor. Alternatively or in addition, the descriptor mapping may include a metric, which measures a likelihood that measures the strength of the mappings based on training data.

Table 3 describes an example of a data structure that includes descriptor mappings. For example, each row in Table 3 may represent a descriptor mapping.

TABLE 3

Descriptor Mapping Table

| Image Descriptor ID | Text Descriptor ID | Weight |
| --- | --- | --- |
| IMG_DESC_DOG | TXT_DUBLIN_1 | 0.6 |
| IMG_DESC_DOG | TXT_IRELAND_2 | 0.4 |
| IMG_DESC_CAT | TXT_DUBLIN_1 | 0.2 |
| IMG_DESC_CAT | TXT_IRELAND_2 | 0.8 |
| IMG_DESC_CAR | TXT_ROME_2 | 1.0 |

The data structure illustrated in Table 3 is a non-limiting example. The data structure may be included in the descriptor repository 102. In other examples, the descriptor repository 102 may include additional or alternative data structure(s) that store descriptor mappings.

Mapping Controller

The system may include a mapping controller 104. The mapping controller 104 may include a descriptor mapping selector 105 and a query generator 106. The descriptor mapping selector 105 may obtain a search image. For example, the descriptor mapping selector 105 may obtain the search image included in or referenced by the image query. The descriptor mapping selector 105 may derive an image descriptor based on the search image. The derived image descriptor may be affinely similar to one or more historical image descriptors in the descriptor repository 102. The descriptor mapping selector 105 may compare the historical image descriptors with the image descriptor derived from the search image. For example, the descriptor mapping selector 105 may identify the historical image descriptors that include real values or weights that are within a predefined range of feature metrics included in the image descriptor derived from the search image. The descriptor mapping selector 105 may select the descriptor mappings that reference the identified historical descriptors.

The query generator 106 may generate a document query based on one or more text descriptors. For example, the query generator 106 may receive the descriptor mappings selected by the descriptor mapping selector 105. The query generator 106 may extract the text descriptors referenced by the descriptor mappings. The query generator 106 compile the text descriptors into a document query. The document query may include one or more search parameters. The search parameters may include the text descriptors. For example, an input image of "dog" is translated to the following text query, "Dublin, Ireland" using the mappings defined in Table 3. The formulation of the textual query can also take into account the weights both in the historical mappings and in the textual descriptors. In the above example, the query strategy includes all the mappings with weights greater than 0 and the word with the top score is selected as the main word in the formulation of the text query.

Text Retrieval System

The system 100 may further include or communicate with a document database 108 and/or a text retrieval system 110. The document database 108 may include a document-oriented database. The document database 108 may store sets of information where each set of information may follow a different data structure. For example, the document database 108 may include a non-relational database that stores structured or semi-structured data as text documents. The content of the text documents, or metadata associated with the text documents, may be searched to identify one or more relevant text documents based on search parameters. Alternatively or in addition, the document database 108 may extract metadata from the content of a text document. The metadata may be searched to identify one or more text document. Depending on the implementation, the document database 108 may store information according to a markup protocol such as XML, YAML, JSON, BSON. Alternatively or in addition, the document database 108 may store documents in binary formats, character encoded format, and/or any other suitable file encoding.

The text retrieval system 110 may access the document database 108 to identify one or more text document records based on search parameters. For example, the text retrieval system 110 may receive the document query created by the query generator 106. The document query may include and/or reference one or more text descriptors. The text retrieval system 110 may search the document database 108 for one or more documents based on the text descriptors. The text retrieval system 110 may generate a document query result.

The document query result may include and/or reference the text documents stored in the document database 108 and identified based on the document query. For example, the document query results may include the text data and/or document identifiers for the identified documents. A document identifier may include a file name, a key, a path, and/or any other information that identifies a particular document or a location of a particular document in memory.

The documents stored in the document database 108 may include text documents. The text documents may include one or more historical text descriptor. As described below, the text document may have been generated by identifying image descriptors in an image file that are mapped to text descriptors. The mapped text descriptors may be compiled into a text document such that a text document stored in the image database corresponds to an image file. As described below, the text document may be mapped to an image file and the image file may be identified based on the text document.

File Mapping Repository

The system may include a file mapping repository 112. The file mapping repository 112 may include file mappings. A file mapping may include an association between an image file and a text document. For example, the file mapping may include may an image identifier and a document identifier. The image identifier may include a file name, a key, a path, and/or any other information that identifies a particular image in an indexed set of images. The document identifier may include an identifier of a document stored in the document database 108, or some other information that identifies a document in an indexed set of documents.

Table 4 describes an example of a data structure included in the file mapping repository 112. Each row of Table 4 may represent a file mapping. In other examples, the file mapping may include additional or alternative information, such as image data, text data, and/or metadata. To guaranty invertibility between the image domain and the text domain, an image name needs to be associated only to one document name and vice versa.

TABLE 4

File Mapping Table

| IMAGE IDENTIFIER | DOCUMENT IDENTIFIER |
|---|---|
| Dog.JPG | Dog_Text_Descriptors.txt |
| ... | ... |

The data structure illustrated in Table 4 is a non-limiting example. In other examples, the file mapping repository 112 may include additional or alternative data structure(s) that store one or more file mappings.

In some examples, the system 100 may further include an image repository 113. The image repository 113 may include images and/or image identifiers. For example, the image repository 113 may store images that are included or referenced in the image query results. Images stored in the image repository 113 may be mapped with text documents stored in the document database 108. The image query results provided by the system 100 may be generated based the document query results provided by the text retrieval system 110. For example, the document identifiers included in the document query results may be included in file mappings stored in the file mapping repository 112. Image identifiers may be mapped to the document identifiers based on the file mappings stored in the file mapping repository. Therefore, the image identifier may be extracted from the file mapping database and included in the image query result.

Inverse Mapping Controller

The system 100 may include an inverse mapping controller 114. The inverse mapping controller 114 may include a file mapping selector 116 and an image results generator 118. The file mapping selector 116 may identify a file mapping based on one or more document identifiers. For example, the file mapping selector 116 may select file mappings based on document identifiers included in the document query result. The file mapping selector 116 may select file mappings in the file mapping repository 112. The selected file mappings may be associated with the document identifiers included in document query result. Each of the selected file mappings may be associated with a corresponding image identifier.

The image results generator 118 may generate the image query results. In some examples, the image results generator 118 may obtain the image identifiers associated with the file mappings selected by the file mapping selector 116. Image results generator 118 may obtain the images corresponding to the image identifiers. For example, the image results generator 118 may obtain the images from the image repository 113 and include the images in the image query results.

In addition, or in alternative to, including images in the image query results, the image query results may include instructions that cause one or more remote device to access images. For example, the image query results may include a web address, a path, and/or some other instruction or link that causes a remote device to access images. Alternatively or in addition, the image query results may cause the remote device to request the image from the image retrieval system or some other source. For example, the image query results may include an instruction that causes the remote device to request the image from the image retrieval system based on an image identifier. The image retrieval system may respond to the request by obtaining an image from the image repository 113 and transmitting the image to the remote device.

In some examples, the image results generator 118 may rank images in the query results. The ranking of the image results may be performed using the visual similarity between the query image and the image retrieved by the Image Results Generator 118. The visual similarity may be computed using the distances between image features.

Figure 2:
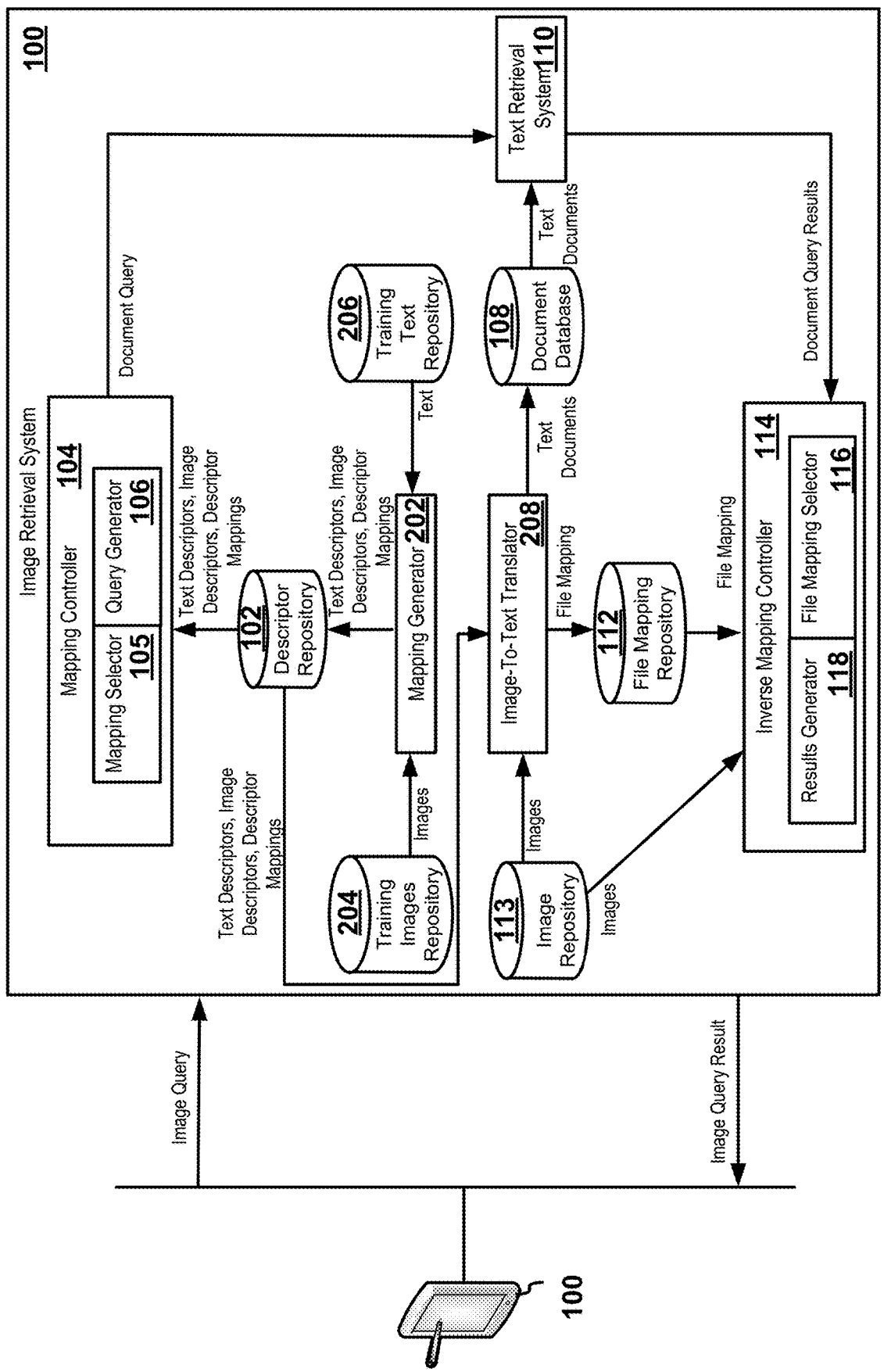
FIG. 2 illustrates a second example of an image retrieval system.

FIG. 2 illustrates a second example of the image retrieval system 100. The image retrieval system may include a mapping generator 202. The mapping generator 202 may receive training images and/or training text. For example, the mapping generator 202 may receive training images from a training image repository 204. The mapping generator 202 may receive text samples from a training text repository 206. The mapping generator 202 may generate one or more image descriptor from the training image. For example, the mapping generator 202 may perform visual patterns extraction using machine-learning algorithms to generate the image descriptors.

The mapping generator 202 may generate one or more text descriptor from the training text. For example, the mapping generator 202 may perform textual pattern extraction with machine learning algorithms to generate the text descriptors.

The mapping generator 202 may identify image descriptors that are affinely similar. As previously discussed in reference to FIG. 1, image descriptors may be affinely similar when the real values representative of features for the image descriptors and/or weighted values derived from the real values are greater than a threshold value or image feature similarity. Likewise, text descriptors may be affinely similar when real values of the features of the text descriptor and/or weight values derived from the real values are greater than a threshold value for text feature similarity.

The mapping generator 202 may map affinely similar text descriptors to affinely similar image descriptors. The mappings may be generated based on an optimization algorithm that selects mappings that minimize a cost function defined in terms of the local similarity in the image and textual domains. The cost function ensures that the images in the training image repository 204 that are similar in the image domain maps in documents in the training text repository 206 that are similar in the textual domain.

The system 100 may include an image-to-text translator 208. The image-to-text translator 208 may receive a source image. For example, the image-to-text translator 208 may access one or more images from the image repository 113. The image-to-text translator 208 may derive image descriptors from the source image. The image-to-text translator 208 may compare the derived image descriptors with image descriptors previously derived from the training images. The image-to-text translator 208 may select one or more mappings from the descriptor repository 102. The selected mappings may include images descriptors that are the same or similar to the derived image descriptors. The image-to-text translator 208 may extract the text descriptors associated with the selected descriptor mappings.

The image-to-text translator 208 may generate and/or update the document database 108. For example, the image-to-text translator 208 may compile the extracted text descriptors into a text document. In some examples, the image-to-text translator 208 may generate a text document based on the text descriptors determined for each image. The image-to-text translator 208 may insert the text documents into the document database 108. Alternatively or in addition, the image-to-text translator 208 may update an existing text document.

As discussed in reference to FIG. 1, a file mapping may associate the source image with a text document that was generated based on the source image. The image-to-text translator 208 may insert the file mapping into the file-mapping repository. In some examples, the file mapping may include a one to one correspondence between an image file and a text document.

Figure 3:
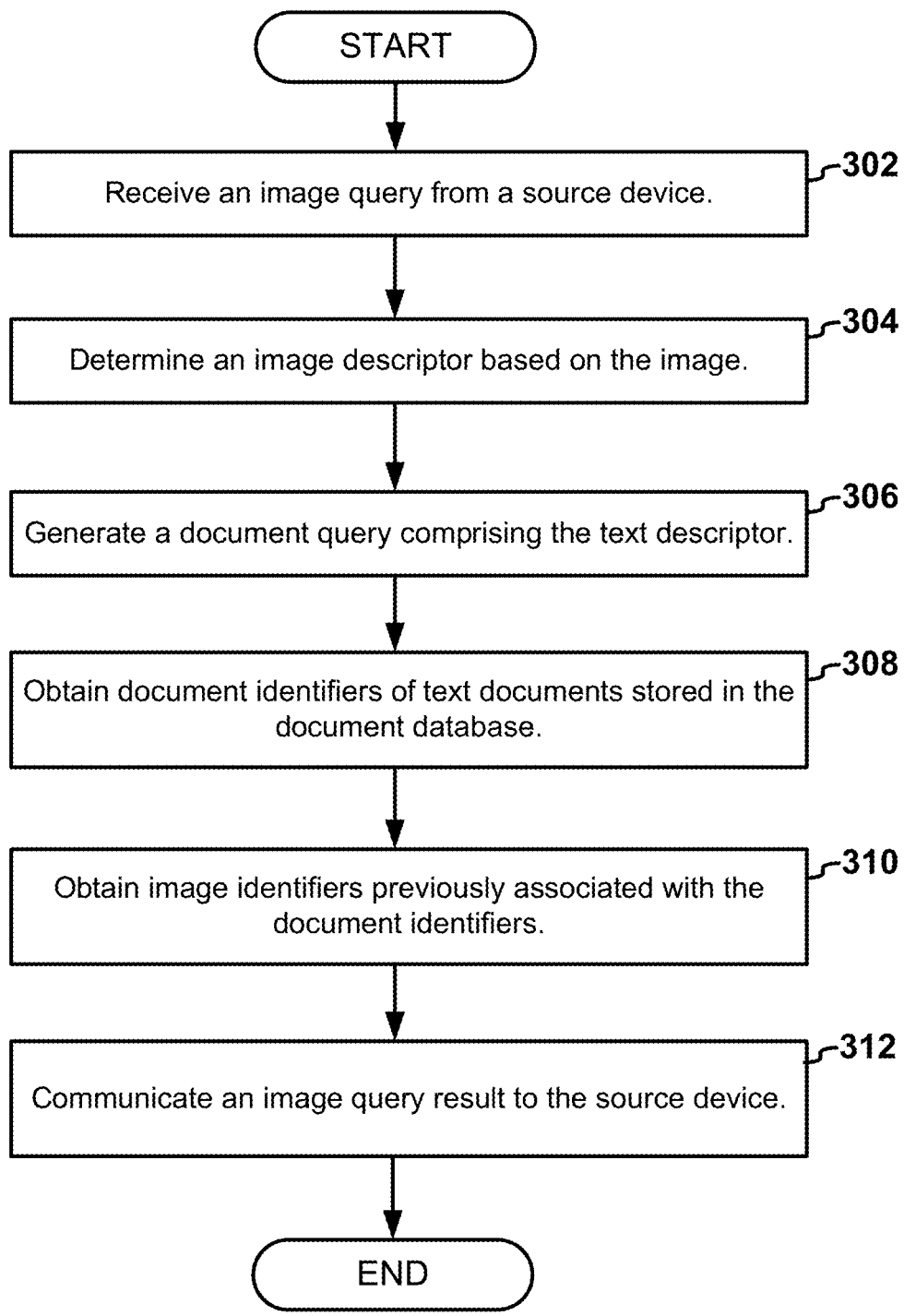
FIG. 3 illustrates a flow diagram of an example of logic for a system.

FIG. 3 illustrates a flow diagram of an example of logic for the system 100. The mapping controller 104 may receive an image query from the remote device (302). The mapping controller 104 may obtain one or more search images from the image query. Alternatively or in addition, the mapping controller 104 may access generate an image from an address and/or path specified by the image query.

The mapping controller 104 may determine an image descriptor based on the image (304). For example, the mapping controller 104 may derive one or features included in the image data of the search image. The features may include one or more feature metric that measures presence of image characteristics in the image. The mapping controller 104 may compare the derived feature with the features of one or more historical image descriptors stored in the descriptor repository 102. The mapping controller 104 may select one or more historical image descriptors based on the comparison.

The mapping controller 104 may select a descriptor mapping, or descriptor mappings, that is associated with the selected image descriptor. Based on the selected descriptor mappings, the mapping controller 104 may select one or more text descriptors. For example, the descriptor mappings may include an image descriptor identifier and a text descriptor identifier. The mapping controller 104 may extract text descriptor identifier from the descriptor mapping. Alternatively or in addition, the mapping controller 104 may obtain the text descriptor from the descriptor repository 102 and/or directly from the descriptor mapping.

The mapping controller 104 generate a document query comprising the text descriptor (306). For example, the mapping controller 104 may compile one or more extracted text descriptors into the document query. The document query may include an instruction to query the document database 108.

The text retrieval system 110 obtain document identifiers of text documents stored in the document database 108 (308). For example, the text retrieval system 110 may query the document database 108 based on the document query. The document database 108 may identify one or more text document based on the text descriptor, or portions of the text descriptor, included in the document query. The text retrieval system 110 may generate a document query result that includes the documents and/or identifiers of the documents.

The inverse mapping controller 114 may obtain image identifiers previously associated with the document identifiers (310). For example, the inverse mapping controller 114 may receive one or more text document or document identifier. The inverse mapping controller 114 may search the file mapping repository 112 for a file mapping associated with the document identifier. The inverse mapping controller 114 may select a file mapping in response to the file mapping including the document identifier. The inverse mapping controller 114 may extract an image identifier from the file mapping.

The inverse mapping controller may communicate an image query result to the source device (312). For example, the inverse mapping controller 114 may generate the image query result. The image query result may include one or more image identifiers obtained based on the document query result. Alternatively or in addition, the image query result may include images corresponding to the image identifiers. In some examples, the image query results may include an instruction to obtain the image from a source location. For example, the image query results may include an instruction that generates a message that includes one or more image identifiers. The inverse mapping controller 114 may, in response to receiving the message from a source device, obtain images from the image repository 113 and send the images to the source device.

Figure 4:
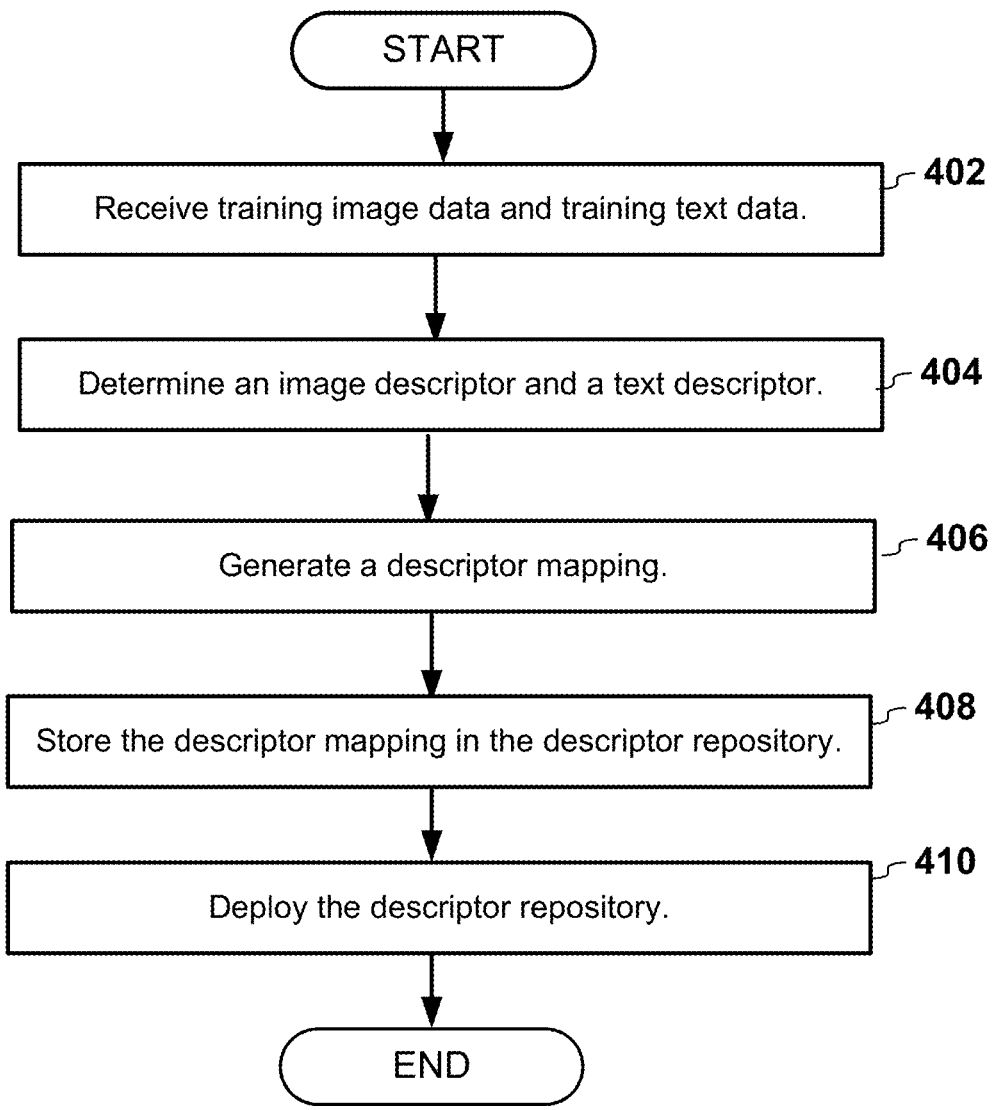
FIG. 4 illustrates a flow diagram of a second example of logic for a system.

FIG. 4 illustrates a flow diagram of a second example of logic for the system 100. The mapping generator 202 may receive training image data and training text data (402). For example, the mapping generator 202 may receive the training image data from a training images repository 204. Alternatively or in addition, the mapping generator 202 may receive training text from a training text repository 206.

The mapping generator 202 determine an image descriptor and a text descriptor (404). The descriptor generator may generate a descriptor mapping (406). For example, the text descriptor and image descriptor may be determined as discussed in reference to FIG. 2. The descriptor mapping may include an identifier of the image descriptor and an identifier of the text descriptor. The descriptor generator may store the descriptor mapping in the descriptor repository 102 (408).

In some examples, the mapping generator 202 may deploy the descriptor repository 102 (410). For example, the mapping generator 202 may be deployed to a remote server that includes or communicates with the mapping controller 104. The descriptor repository 102 may be deployed to the remote server. In some examples, the descriptor repository 102 may be pre-populated before deployment. In other examples, the descriptor repository 102 may be deployed first and then populated with image descriptors, text descriptors, and/or descriptor mappings. Deployment may include sending the descriptor repository 102 to a server, configuring the descriptor repository 102 on the server, and/or sending information to the server to be stored in the descriptor repository 102 configured on the server.

Figure 5:
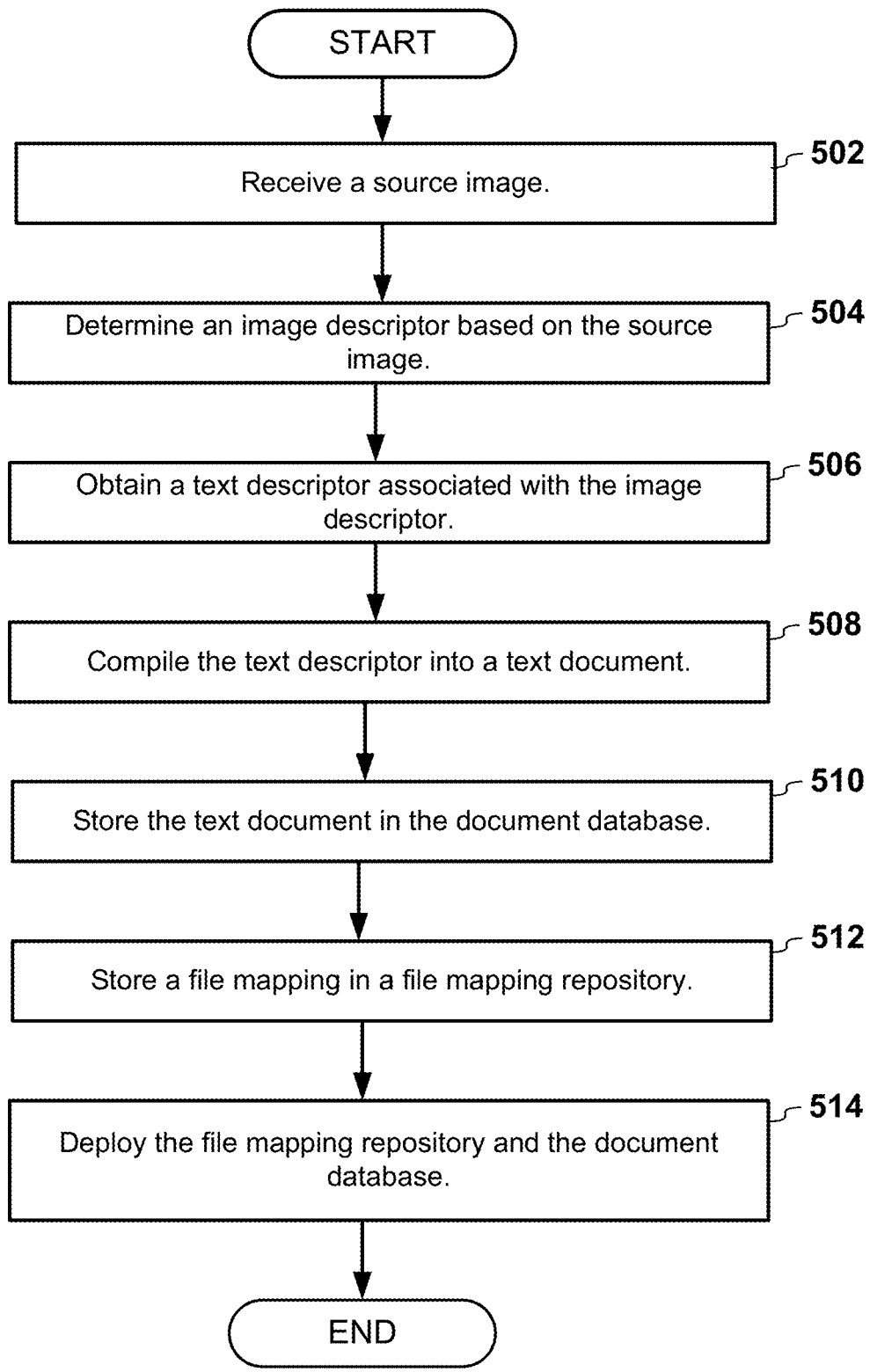
FIG. 5 illustrates a flow diagram of a third example of logic for a system 100.

FIG. 5 illustrates a flow diagram of a third example of logic for the system 100. The image-to-text translator 208 may receive a source image (502). Alternatively or in addition, the image-to-text translator 208 may receive an identifier of a source image and then access the source image. The source image may be stored in an image repository 113.

The image-to-text translator 208 may determine an image descriptor based on the source image (504). The image-to-text translator 208 may obtain a text descriptor associated with the image descriptor (506).

For example, the image-to-text translator 208 may obtain a descriptor mapping associated with the image descriptor identified for the source image. The descriptor mapping may associate the identified image descriptor with one or more text descriptor. In some examples, the descriptor mapping may map an identifier of the image descriptor to an identifier of the text descriptor. The image-to-text translator 208 may extract the identifier of the text descriptor. The image-to-text translator 208 may search the descriptor database, or some other source, for the text descriptor based on the identifier. In some examples, the image-to-text translator 208 may identify multiple text descriptors based on the image descriptors and/or descriptor mappings identified for the source image.

The image-to-text translator 208 may compile the text descriptor into a text document (508). For example, may include one or more text descriptors in a text document. In some examples, the image-to-text translator 208 may modify text descriptor to conform to a markup language or document structure, such as XML, JSON, or some other suitable stander.

The image-to-text translator 208 may store the text document in the document database 108 (510). For example, the image-to-text translator 208 may communicate the text document to the document database 108.

The image-to-text translator 208 store a file mapping in a file mapping repository 112 (512). For example, the image-to-text translator 208 may generate the file mapping. The file mapping may include an identifier of the source image and an identifier of the generated document. The file mapping may include a one-to-one relationship between source image and the generated text document. The image-to-text translator 208 may insert the generated file mapping into the file mapping repository 112.

The image-to-text translator 208 may deploy the file mapping repository 112 and/or the document database 108 (514). For example, the image-to-text may communicate the file mapping repository 112 and/or the document database 108 to a server configured with the inverse mapping controller 114. Alternatively or in addition, the image-to-text translator 208 may configure the mapping repository and/or the document database 108 on the server, then populate the mapping repository and/or the document database 108 with data. In other examples, the image-to-text translator 208 may update the file mapping repository 112 and/or the document database 108 with new data as new source images are determined. For example, the image-to-text translator 208 may receive additional source images. For each of the source images received, the image-to-text translator 208 may generate a corresponding text document and a corresponding file mapping.

The logic illustrated in the flow diagrams may include additional, different, or fewer operations than illustrated. The operations illustrated may be performed in an order different than illustrated. Moreover, the system 100 may be implemented with additional, different, or fewer components than illustrated. Each component may include additional, different, or fewer components. For example, the system 100 may include the mapping controller 104 and the inverse mapping controller 114. Alternatively or in addition, the system may include the mapping generator 202 and image-to-text translator. For example, the system may comprise a learning and configuration system that builds, deploys, and/or updates the descriptor repository 102, the file mapping repository 112, and/o the document database 108.

Figure 6:
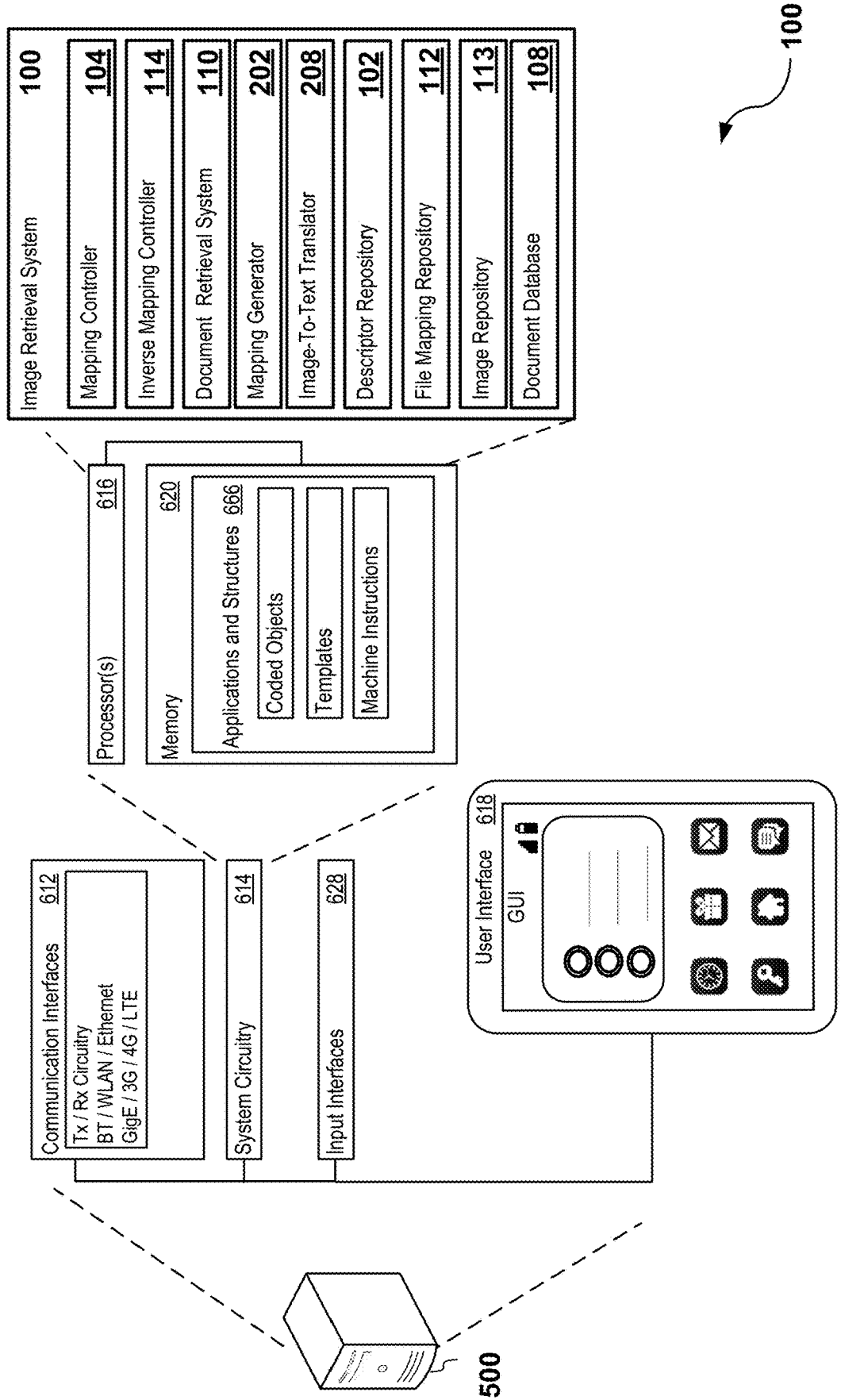
FIG. 6 illustrates a flow diagram of an example of a computer execution environment.

FIG. 6 illustrates an example of a computer environment 600 for the system 100. The computer environment 600 may include a hardware platform for the image retrieval system 100 and/or any subcomponent therein. The computer environment 600 may include communication interfaces 612, input interfaces 628 and/or system circuitry 614. The system circuitry 614 may include a processor 616 or multiple processors. Alternatively or in addition, the system circuitry 614 may include memory 620.

The processor 616 may be in communication with the memory 620. In some examples, the processor 616 may also be in communication with additional elements, such as the communication interfaces 612, the input interfaces 628, and/or the user interface. Examples of the processor 616 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 616 may be one or more devices operable to execute logic. The logic may include computer executable instructions or computer code stored in the memory 620 or in other memory that when executed by the processor 616, cause the processor 616 to perform the features implemented by the logic of the mapping controller 104, the inverse mapping controller 114, the text retrieval system 110, the mapping generator 202, the image-to-text-translator, the descriptor repository 102, the file mapping repository 112, the image repository 113, the document database 108, the system 100, or any component or subcomponent of the system 100. The computer code may include instructions executable with the processor 616.

The memory 620 may be any device for storing and retrieving data or any combination thereof. The memory 620 may include non-volatile and/or volatile memory, such as a random access memory (RAM), a read-only memory (ROM), an erasable programmable read-only memory (EPROM), or flash memory. Alternatively or in addition, the memory 620 may include an optical, magnetic (hard-drive), solid-state drive or any other form of data storage device. The memory 620 may include at least one of the mapping controller 104, the inverse mapping controller 114, the text retrieval system 110, the mapping generator 202, the image-to-text-translator, the descriptor repository 102, the file mapping repository 112, the image repository 113, the document database 108, the system 100, or any component or subcomponent of the system 100.

The user interface 618 may include any interface for displaying graphical information. The system circuitry 614 and/or the communications interface(s) 612 may communicate signals or commands to the user interface 618 that cause the user interface to display graphical information. Alternatively or in addition, the user interface 618 may be remote to the system 100 and the system circuitry 614 and/or communication interface(s) may communicate instructions, such as HTML, to the user interface to cause the user interface to display, compile, and/or render information content. In some examples, the content displayed by the user interface 618 may be interactive or responsive to user input. For example, the user interface 618 may communicate signals, messages, and/or information back to the communications interface 612 or system circuitry 614.

The system 100 may be implemented in many different ways. In some examples, the system 100 may be implemented with one or more logical components. For example, the logical components of the system 100 may be hardware or a combination of hardware and software. The logical components may include the mapping controller 104, the inverse mapping controller 114, the text retrieval system 110, the mapping generator 202, the image-to-text-translator 208, the descriptor repository 102, the file mapping repository 112, the image repository 113, the document database 108, the system 100, or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 620, for example, that comprises instructions executable with the processor 616 or other processor to implement one or more of the features of the logical components. When any one of the logical components includes the portion of the memory that comprises instructions executable with the processor 616, the component may or may not include the processor 616. In some examples, each logical component may just be the portion of the memory 620 or other physical memory that comprises instructions executable with the processor 616, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media.

The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible.

Accordingly, the embodiments described herein are examples, not the only possible embodiments and implementations.

What is claimed is:

1. An image retrieval system, comprising:
a memory and a processor, the memory comprising:
   a descriptor repository comprising a plurality of descriptor mappings, the descriptor mappings comprising a respective association between image descriptors and text descriptors;
   a file mapping repository comprising file mappings, wherein each of the file mappings comprising an association between a corresponding image and a corresponding text document;
wherein the processor is configured to:
   receive an image query, the image query comprising image data;
   determine one or more image descriptors based on the image data, said determination comprising:
      deriving a plurality of a feature metrics for the image data; and
      selecting, from the descriptor repository that stores many-to-many mappings between image descriptors and text descriptors, each of the one or more image descriptors based on a comparison of the feature metrics of said image descriptor with the feature metrics of the image data;
   obtain, based on a descriptor mapping in the descriptor repository, one or more text descriptors mapped to that image descriptor, for each of the one or more determined image descriptors;
   generate a document query comprising a search parameter, the search parameter based on the one or more text descriptors;
   identify, in a document database, text documents based on the document query, the text documents associated with document identifiers;
   obtain, based on the file mappings in the file mapping repository, image identifiers associated with the document identifiers;
   determine an image query result based on the image identifier; and
   communicate the image query result to a remote device, the image query results indicative of images corresponding to the image identifiers.

2. The image retrieval system of claim 1, wherein the image query results comprise images corresponding to the image identifiers.

3. The image retrieval system of claim 1, further comprising:
   prioritizing the images in a ranking order;
   generating the image query result, wherein the image query result is indicative of the images prioritized in the ranking order.

4. The image retrieval system of claim 1, wherein the processor is further configured to generate the descriptor mappings stored in the descriptor repository, wherein to generate the descriptor mappings, the processor is further configured to:
   receive training images data and training text data;
   determine the image descriptors based on the training images data;
   determine the text descriptors based on the training text data; and
   map the text descriptors to the image descriptors based on a machine learning model.

5. The image retrieval system of claim 1, wherein the processor is further configured to:
   generate the text documents for the document database, wherein to generate the text documents, the processor is further configured to:
      obtain a source image from an image repository;
      select, based on features of source image, previous determined image descriptors included in the descriptor mappings;
      obtain, from the descriptor repository, previously determined text descriptors associated with the previous determined image descriptors;
      compile the text descriptors into a new text document; and
      store the new text document in the document database.

6. The image retrieval system of claim 5, wherein the processor is further configured to generate the file mappings stored in the file mapping repository, wherein to generate the file mappings, the processor is further configured to:
   generate a file mapping, the file mapping comprising an identifier of the source image and an identifier of the new text document; and
   store the file mapping in the file mapping repository.

7. The image retrieval system of claim 1,
   wherein to obtain the image identifiers, the processor is further configured to:
      select the file mappings from the file mapping repository based on the document identifiers; and
      extract the image identifiers from the file mappings.

8. The image retrieval system of claim 1, wherein to obtain, from the file mapping repository, image identifiers associated with the document identifiers, the processor is further configured to:
   identify, in the file mapping repository, a file mapping comprising at least one of the document identifiers and at least one of the image identifiers; and
   extract the at least one of the image identifiers from the file mapping.

9. A method, comprising:
   receiving, an image query generated by a remote device, the image query comprising image data;
   determining one or more image descriptors based on the image data, said determining comprising:
      deriving a plurality of a feature metrics for the image data; and
      selecting, from a descriptor repository that stores many-to-many mappings between image descriptors and text descriptors, each of the one or more image descriptors based on a comparison of the feature metrics of said image descriptor with the feature metrics of the image data;
   obtaining one or more text descriptors, said obtaining comprising, for each of the one or more determined image descriptors, obtaining the one or more text descriptors mapped to that image descriptor in the descriptor repository;
   generating an document query comprising a search parameter, the search parameter including the one or more text descriptors;
   identifying, in a document database, based on the document query, document identifiers of text documents;
   identifying, in a file mapping repository, image identifiers mapped to the document identifiers; and
   communicating an image query result to the remote device, the image query results indicative of images corresponding to the image identifiers.

10. The method of claim 9, wherein the image query results comprise an instruction configured to cause the remote device to access, from an image repository, at least one of the images corresponding to the image identifiers.

11. The method of claim 9, further comprising:
prioritizing the images in a ranking order; and
generating the image query result, wherein the image query result is indicative of the images prioritized in the ranking order.

12. The method of claim 9, further comprising:
receiving training images data and training text data;
determining the image descriptors based on the training images data;
determining the text descriptors based on the training text data;
generating a descriptor mappings between the image descriptors and the text descriptors based on a machine learning model; and
storing the descriptor mappings in the descriptor repository.

13. The method of claim 9, further comprising:
obtaining a source image from an image repository;
selecting, based on features of source image, previous determined image descriptors included in the descriptor repository;
obtaining, from the descriptor repository, previously determined text descriptors associated with the previous determined image descriptors;
compiling the text descriptors into a new text document; and
storing the new text document in the document database.

14. The method of claim 13, further comprising:
generating a file mapping comprising an identifier of the source image and an identifier of the new text document; and
storing the file mapping in the file mapping repository.

15. A method, comprising:
generating a descriptor mapping for a descriptor repository by:
receiving training image data and training text data,
determining an image descriptor based on the training image data, said determining comprising:
deriving a plurality of a feature metrics for the image data; and
selecting, from a descriptor repository that stores many-to-many mappings between image descriptors and text descriptors, each of the one or more image descriptors based on a comparison of the feature metrics of said image descriptor with the feature metrics of the image data,
generating a descriptor mapping comprising an association between the image descriptor and a text descriptor, and
storing the descriptor mapping in the descriptor repository;
generating a text document for a document database by:
determining the image descriptor is descriptive of a source image,
retrieving, based on the descriptor mapping, the text descriptor associated with the image descriptor,
compiling the text descriptor into a new text document, and
storing the new text document in the document database;
storing a file mapping in a file mapping repository, the file mapping comprising an identifier of the source image and an identifier of the new text document;
responding to an image query comprising search image data by:
selecting the image descriptor based on a comparison of features of the search image data with features of the image descriptor,
generating a document query comprising the text descriptor associated with the image descriptor in the descriptor mapping,
receiving, based on the document query, a document identifier of the new text document stored in the document database,
obtaining the image identifier associated with the document identifier in the file mapping repository; and
communicating an image query result to a remote device, the image query result indicative of the image corresponding to the image identifier.

16. The method of claim 15, wherein the source image is obtained from an image repository, the image repository comprising a plurality of images, each of the images mapped to a corresponding text document based on a plurality of file mappings stored in the file mapping repository.

17. The method of claim 16, further comprising:
obtaining, from the image repository, the image corresponding to the image identifier; and
generating the image query result, the image query result comprising the image, and identifier of the image, an instruction to obtain the image, or any combination thereof.

* * * * *